United States Patent [19]

Sekiya et al.

[11] 4,423,089

[45] Dec. 27, 1983

[54] SUBBING PROCESS FOR PHOTOGRAPHIC LIGHT-SENSITIVE MATERIALS

[75] Inventors: Masayoshi Sekiya, Tokyo; Masao Yabe, Fujinomiya; Tamotsu Suzuki, Fujinomiya; Takeji Ochiai, Fujinomiya; Sumitaka Tatsuta, Fujinomiya, all of Japan

[73] Assignees: Fuji Photo Film Co., Ltd., Kanagawa; Nippon Zeon Co., Ltd., Tokyo, both of Japan

[21] Appl. No.: 264,155

[22] Filed: May 15, 1981

[30] Foreign Application Priority Data

May 15, 1980 [JP] Japan .................................. 55-64739

[51] Int. Cl.³ ........................ B05C 3/107; B05D 3/02
[52] U.S. Cl. .................................. 427/171; 427/207.1; 427/393.5
[58] Field of Search .................. 427/171, 207.1, 393.5, 427/379

[56] References Cited

U.S. PATENT DOCUMENTS

| 4,132,552 | 1/1979 | van Paesschen et al. ....... 427/171 X |
| 4,265,946 | 5/1981 | Yabe et al. ....................... 427/393.5 |
| 4,312,916 | 1/1982 | Kakumaru et al. ........... 427/207.1 X |

*Primary Examiner*—Thurman K. Page
*Attorney, Agent, or Firm*—Sughrue, Mion, Zinn, Macpeak & Seas

[57] ABSTRACT

A subbing process for a photographic light-sensitive material is described comprising applying a polymer latex to a plastic film base, wherein said polymer is a copolymer composed of (1) a diolefin monomer, (2) at least one monovinyl monomer, and (3) at least one monomer having two or more vinyl groups, acryloyl groups, methacryloyl groups, or allyl groups excepting the diolefin monomer, and having a gel fraction of the polymer in the latex is from 50% to 95% by weight.

17 Claims, No Drawings

SUBBING PROCESS FOR PHOTOGRAPHIC LIGHT-SENSITIVE MATERIALS

FIELD OF THE INVENTION

The present invention relates to a process for applying a so-called subbing layer to a plastic film base prior to application of a photographic hydrophilic organic colloid layer (referred to hereinafter as the photographic layer), such as a silver halide photographic emulsion layer, in order to obtain firm adhesion of said photographic layer to the base.

BACKGROUND OF THE INVENTION

Hitherto, in order to firmly bond the photographic layer to the plastic film base, two processes have been used, namely, (i) a process which comprises applying the photographic layer directly to the plastic film base after the base is subjected to a surface activating treatment, such as a chemical treatment, an electrical discharge treatment, an ultraviolet ray application, etc., and (ii) a process which comprises applying a subbing layer after carrying out a surface activating treatment and applying the photographic layer to the resulting subbing layer.

Such processes have been described, for example, in U.S. Pat. No. 2,698,241, 2,764,520, 2,864,755, 2,864,756, and 3,475,193 and British Pat. Nos. 788,365, 804,005, and 891,469.

Of these processes, the process (ii) has been more widely used in general. Particularly, in the case wherein the base is polyethylene terephthalate (referred to as PET, hereinafter) or polystyrene, the photographic layer does not sufficiently bond to the base if a subbing layer is not provided after carrying out the surface activating treatment.

However, the above-described surface activating treatment has various faults. For instance, if the surface of the base is treated with a solvent, surface flatness of the base deteriorates and the residual solvent can have an adverse influence upon the photographic layers, and particularly upon the silver halide emulsion layer(s). Furthermore, in order to obtain sufficient adhesion by the ultraviolet ray application, it is necessary to expose the base at a high temperature above the glass transition temperature during the treatment. Consequently, the surface flatness of the base remarkably deteriorates because of decrease of a modulus of elasticity and contraction by heat, etc.

Furthermore, if sufficient adhesion is intended to be obtained by the corona discharge treatment, it is necessary to carry out the treatment at a high temperature above the glass transition temperature, and consequently the same results as in the case of the ultraviolet ray application are obtained.

Moreover, the surface activating treatment not only causes deterioration of external quality but also has an adverse influence upon the photographic layer because of formation of a very small amount of oligomers and acetaldehyde, etc. Accordingly, it has been desired to provide a subbing process by which the sufficient adhesion can be obtained without carrying out the surface activating treatment or with less degree of the surface activating treatment as far as possible, though required.

As one means therefor, there is a process which comprises incorporating a solvent capable of swelling or dissolving the base in a subbing solution.

As known solvents for polyethylene terephthalate, there are, for example, salicylic acid, trichloroacetic acid, pyrrole, chloral hydrate, phenol, p-chlorophenol, pyrogallol and resorcinol, etc.

However, these solvents are generally difficult to handle and toxic to the human bodies. Further, they create problems of environmental pollution. Accordingly, their use is greatly restricted.

For the purpose of overcoming the above-described problems of the prior art, subbing processes using an aqueous dispersion of a polymer latex have been developed in recent times.

Some such subbing processes using an aqueous dispersion of a copolymer composed of (1) a diolefin monomer, (2) one or more vinyl monomers, and, sometimes, (3) another component, are described in Japanese Patent Applications (OPI) Nos. 112326/76, 117617/76, 121323/76, 123139/76 and 139320/76 (the term "OPI" as used herein refers to a "published unexamined Japanese patent application"). Further, the present inventors have studied about a blending process described in Japanese Patent Application (OPI) No. 65422/77 wherein it is intended to obtain desired properties by blending styrene-butadiene based latex with another latex and an addition process described in Japanese Patent Application (OPI) No. 114120/76 wherein it is intended to obtain desired properties by adding additives, e.g., hardeners to styrene-butadiene based latex.

According to these processes, a certain degree of adhesive strength can be obtained without causing problems of toxicity and environmetal pollution. However, in order to obtain sufficient adhesive strength, it is necessary to carry out a separate intensive heat treatment after application and drying in the subbing step. Accordingly, these processes are disadvantageous in both operation and cost.

For the purpose of overcoming this problem, a subbing process has been studied which comprises applying an aqueous dispersion of a copolymer composed of (i) a diolefin monomer and (ii) one or more vinyl monomers, wherein the gel fraction of the copolymer in the aqueous dispersion is less than 80% by weight, as is described in British patent application No. GB 2,040,730A.

According to this process, sufficient adhesive strength can be obtained under a condition of a low heating temperature during the step of application and drying without causing problems of toxicity and envinronmetal pollution. However, in the case wherein the subbing is carried out using a copolymer having a low gel fraction, there is a problem in that the surface of the subbing layer is easily scratched in the drying step. Such a state in the subbing layer can be visually observed through the photographic emulsion layer after application thereof and development of the film, and is therefore very undesirable.

SUMMARY OF THE INVENTION

Accordingly, a first object of the present invention is to provide a subbing process by which the photographic layer firmly bonds to the base without having an adverse influence upon the surface of the subbing layer and without the necessity of subjecting the base to a surface activating treatment.

A second object is to provide a subbing process which comprises firmly bonding the photographic layer to the base with using a non-toxic subbing solution which does not create problems of environmental pollution.

A third object is to provide a subbing process by which sufficient adhesive strength can be obtained even if the subbing treatment is carried out at a comparatively low temperature.

A fourth object is to provide a subbing process by which sufficient adhesive strength is obtained without damaging surface flatness of the base.

A fifth object is to provide a subbing solution which does not require a surface activating treatment, is non-toxic to human bodies, and does not cause environmental pollution problems, by which sufficient adhesion can be obtained even if treated at a comparatively low temperature.

A sixth object is to provide photographic light-sensitive material having a subbing layer formed from the above-described subbing solution.

The objects of the present invention have been attained by providing a subbing process for a photographic light-sensitive material comprising applying a polymer latex to a plastic film base, wherein said polymer is a copolymer composed of (1) a diolefin monomer, (2) at least one monovinyl monomer, and (3) at least one monomer having two or more vinyl groups, acryloyl groups, methacryloyl groups, or allyl groups excepting the diolefin monomer, and having a gel fraction of the polymer in the latex is from 50% to 95% by weight.

DETAILED DESCRIPTION OF THE INVENTION

In the present invention, as the diolefin monomer composing the copolymer as the first component, conjugated dienes such as butadiene, isoprene, and chloroprene can be used. Particularly, butadiene is preferably used.

As the monovinyl monomers as the second component of the copolymer used in the present invention, any monomer may be used if it has a single vinyl group. Preferred examples of the monovinyl monomer include (i) styrene, acrylonitrile, methyl methacrylate, vinyl chloride, vinyl acetate, and derivatives thereof, and (ii) alkyl acrylates, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylolated acrylamide, N-methylolated methacrylamide, vinyl isocyanate, and allyl isocyanate.

Examples of the above-described derivatives of styrene include methylstyrene, dimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, and methyl vinylbenzoate.

Preferred examples of the monomer described in (ii) above include acrylic acid esters, glycidyl acrylate, glycidyl methacrylate, 2-hydroxyethyl acrylate, and 2-hydroxyethyl methacrylate.

Examples of the monomers having two or more vinyl groups, acryloyl groups, methacryloyl groups, or allyl groups in the molecule which are the third component of the copolymer used in the present invention include the so-called cross-linking agents which are added at polymerization of vinyl monomers, such as divinylbenzene, 1,5-hexadiene-3-yne, hexatriene, divinyl ether, divinyl sulfone, diallyl phthalate, diallyl carbinol, diethylene glycol dimethacrylate, trimethylolpropane trimethacrylate, and trimethylolpropane dimethacrylate.

A preferred content of the diolefin monomer (1) in the copolymer of the present invention is from about 10% to 60% by weight, based on the total weight of the components (1) and (2), and more preferably is from about 15% to 40% by weight.

A content of monovinyl monomer(s) (2) is preferably from about 90% to 40% by weight (based on the total weight of the copolymer). However, it is particularly preferred that the above-described monovinyl monomers (i), and particularly styrene derivatives, be contained in the copolymer in a content of from about 70% to 40% by weight based on the total weight of the components (1) and (2).

It is preferred that the monomer(s) (3) having two or more vinyl groups, acryloyl groups, methacryloyl groups, or allyl groups be contained in the copolymer in a content of from 0.01% to 10% by weight, and more preferably from 0.1% to 5% by weight, based on the total weight of the diolefin monomer (1) and the monovinyl monomer (2).

Examples of particularly preferred copolymers among the copolymers of the present invention include the following copolymers:

TABLE 1

| | 1st Component | 2nd Component | | 3rd Component | |
|---|---|---|---|---|---|
| (1) | Butadiene 33 | Styrene | 67 | Divinylbenzene | 0.5 |
| (2) | Butadiene 25 | Styrene | 75 | Divinylbenzene | 0.5 |
| (3) | Butadiene 40 | Styrene | 60 | Divinylbenzene | 0.5 |
| (4) | Butadiene 33 | Styrene | 67 | Divinylbenzene | 0.1 |
| (5) | Butadiene 33 | Styrene | 67 | Divinylbenzene | 5 |
| (6) | Isoprene 33 | Styrene | 67 | Divinylbenzene | 0.5 |
| (7) | Butadiene 33 | Methyl Methacrylate | 67 | Divinylbenzene | 0.5 |
| (8) | Butadiene 33 | Acrylonitrile | 67 | Divinylbenzene | 0.5 |
| (9) | Butadiene 33 | Chloromethylstyrene | 67 | Divinylbenzene | 0.5 |
| (10) | Butadiene 33 | Styrene | 67 | Diethylene Glycol Dimethacrylate | 0.5 |
| (11) | Butadiene 33 | Styrene | 67 | Trimethylolpropane Trimethacrylate | 0.5 |
| (12) | Butadiene 33 | Styrene | 67 | Diallyl Phthalate | 0.5 |

In Table 1, the 1st and 2nd component contents are indicated in % values, based upon the combined weights of the 1st and 2nd components being considered as representing 100% of the weight, the content of the 3rd component represents the % by weight of the 3rd component present based on the total weight of the 1st and 2nd components.

Thus, it is characteristic of the present invention to use a latex of a copolymer composed of (1) a diolefin monomer, (2) at least one monovinyl monomer, and (3) at least one monomer having two or more vinyl groups, acryloyl groups, methacryloyl groups, or allyl groups excepting the diolefin monomer, wherein a gel fraction of the copolymer is from 50% to 95% by weight.

Herein, the term "gel" refers to a state wherein the copolymer components are three-dimensionally polymerized. When the copolymer having the above-described composition of the present invention polymerizes three-dimensionally, solubility thereof in a solvent varies according to the degree of the three-dimensional polymerization. The copolymer becomes difficult to dissolve as the degree of three-dimensional polymerization increases.

Accordingly, the degree of three-dimensional polymerization of the gel can be determined by the solubility thereof. Since the solubility also depends upon the solvent used, definition of the degree of three-dimensional polymerization of the gel varies with the kind of the solvent used. More particularly, then, in the present invention, the term "gel" refers to a three-dimensionally copolymerized state wherein the degree of three-dimensional polymerization is such a degree that the copolymer does not dissolve in purified tetrahydrofuran when immersed therein for 48 hours at 20° C.

Accordingly, the expression "gel fraction" in the present invention means a value calculated with the following formula:

$$\text{Gel Fraction (\%)} = \frac{W_1 - W_2}{W_1} \times 100$$

wherein $W_1$ represents the weight of the copolymer in a sample, and $W_2$ represents the weight of the solid content obtained by drying a filtrate which was obtained by filtering using a filter of 300 mesh after maintaining the sample in purified tetrahydrofuran at 20° C. for 48 hours, in vacuum at 20° C. (i.e., $W_2$ refers to the weight of components of the copolymer dissolving in the tetrahydrofuran).

In the case of using a latex of a copolymer composed of a diolefin monomer and one or more monovinyl monomers as described in British patent application No. GB 2,040,730A wherein the gel fraction of the copolymer of said latex is less than 50% by weight, sufficient adhesive strength can be obtained, but there is a problem in that the surface of the subbing layer is easily scratched in the drying step after application. The state of the surface of the subbing layer deteriorates as the gel fraction decreases, which is contrary to the practically desired adhesive strength in a wet state.

Surprisingly, it has now been found that, even if the gel fraction of the system is 50% by weight or more, adhesive strength equal to or higher than that obtained in the case of having a gel fraction of less than 50% by weight as described in British patent application No. GB 2,040,730A can be obtained by adding a monomer having two or more vinyl groups, acryloyl groups, methacryloyl groups or allyl groups (i.e., a cross-linking agent) to the copolymer composition.

Furthermore, it has surprisingly been found that sufficient adhesive strength in a wet state is obtained even if subjected to heat treatment at a low temperature, provided that the ethylenically unsaturated carboxylic acid component in the copolymer is 0%.

As described above, though it is one of characteristics of the present invention that the gel fraction of the copolymer is from 50% to 95% by weight, a gel fraction of from 60% to 90% by weight in advantageous because of lessened deterioration of the subbing layer and superior adhesive strength.

Preparation of an aqueous dispersion of the copolymer used in the present invention can be made based on the descriptions of, for example, *Goseigomu Gaisetsu (An Outline of Synthetic Rubber)*, pp. 39–59, written by Osami Asai (published by Asakura Shoten, 1971) and *Nippon Gomu Kyokaishi (Journal of the Society of Rubber Industry, Japan)*, Vol. 50, No. 12, pp. 802–806 (1977).

Particularly, it is possible to prepare the polymer latex by emulsion copolymerization of the diolefin monomer and the monovinyl monomers in the presence of water, an emulsifier, a polymerization initiator, and a polymerization regulator (chain transfer agent), etc., as described, for example, in D. C. Blackley: *High Polymer Science*, Vol. 1, p. 284, Maclaren & Sons, Ltd., London.

As the emulsifier, it is possible to use, for example, aliphatic acid soaps and rhodinic acid soaps, etc. The amount thereof is preferred to be in the range of from 0.1 to 5% by weight. As the polymerization initiator, it is possible to use, for example, peroxides, $NaPO_4 \cdot 10H_2O$, $K_2S_2O_8$, p-methane hydroperoxide, $FeSO_4 \cdot 7H_2O$, and EDTA (ethylenediaminetetraacetic acid) tetrasodium salt.

As the polymerization regulator, it is possible to use, for example, primary and tertiary mercaptans having from 6 to 18 carbon atoms, for example, t-dodecylmercaptan, t-nonylmercaptan, and t-decylmercaptan.

An amount of the polymerization regulator used is preferred to be in the range of from 0.05 to 2.0% by weight based on the total content of the latex. The polymerization regulator may be present in a reaction container prior to initiation of the polymerization reaction or may be added little by little during the polymerization reaction.

Further, in order to terminate the polymerization at a suitable stage, it is possible to use a polymerization terminator, such as hydroquinone, dimethylcarbamate, etc. The polymerization terminator may be added at an optional stage at which the polymerization reaction has moderately proceeded, and the amount thereof is preferred to be about 0.1% by weight based on the total content of the latex.

As described above, a gel fraction of from 50% to 95% by weight is one of characteristics of the present invention. A desired value of the gel fraction can be achieved by appropriately selecting the kind and the amount of the polymerization regulator in the emulsion polymerization reaction or by controlling the time of addition of the polymerization terminator.

Selection of the kind and the amount of the polymerization regulator or determination of the time of adding the polymerization terminator can be easily done by experimental means by persons skilled in the art in accordance with the foregoing general guidelines.

After the emulsion polymerization, unreacting monomers are, if desired, removed to obtain a latex of the copolymer according to the present invention. The removal can be carried out by the method described, for example, in Japanese Patent Publication No. 20075/74.

A concentration of the copolymer (as solid content) of the aqueous dispersion can be suitably decided. In general, it is preferred to be in the range of from 10% to 60% by weight, and more preferably from 30% to 50% by weight.

In order to apply the resulting aqueous dispersion of the copolymer according to the present invention as a subbing layer, the aqueous dispersion is diluted with water, and, if desired, a hardening agent, a surface active agent, a swelling agent, a hydrophilic polymer, a matting agent, and an antistatic agent, are added thereto.

The content of the copolymer according to the present invention in the subbing solution is preferably in the range of from 1 to 10% by weight and more preferably 2% to 5% by weight.

As the hardening agent, there are, for example, triazine compounds as described in U.S. Pat. Nos. 3,325,287, 3,288,775 and 3,549,377 and Belgian Pat. No. 6,602,226, dialdehyde compounds as described in U.S. Pat. Nos. 3,291,624 and 3,232,764, French Pat. No. 1,543,694 and British Pat. No. 1,270,578, epoxy compounds as described in U.S. Pat. No. 3,091,537 and Japanese Patent Publication 26580/74, vinyl compounds as described in U.S. Pat. No. 3,642,486, aziridine compounds as described in U.S. Pat. No. 3,392,024, ethyleneimine compounds as described in U.S. Pat. No. 3,549,378, and methylol compounds.

Among these hardening agents, 2,4-dichloro-6-hydroxy-s-triazine sodium salt is preferably used as the triazine compound. The amount of the hardening agent used is from 0.001 to 10 g per liter of the subbing solution.

As the swelling agent, there are, for example, phenol and resorcinol, though it is not necessary to add them. An amount thereof is typically from 1 to 10 g per liter of the subbing solution.

As the hydrophilic polymer it is possible to use natural polymers, such as gelatin, and synthetic polymers, such as polyvinyl alcohol, vinyl acetate-maleic acid anhydride copolymer, acrylic acid-acrylamide copolymer, and styrene-maleic acid anhydride copolymer. The amount thereof is preferred to be in the range of from 0.05 to 5 g, and more preferably from 0.1 to 1 g.

As the matting agent, it is preferred to use silicon dioxide (silica), polystyrene, and polymethyl methacrylate, having an average particle size of from 0.1 to 10μ.

As the antistatic agent, it is possible to use, for example, anionic surface active agents, cationic surface active agents, ionic polymers, maleic acid copolymers as described in Japanese Patent Application (OPI) 3972/74, and colloidal silica (for example, Showtex (trademark) produced by Nissan Chemicals Ind. Co.), etc.

The subbing solution according to the present invention can be applied by well known coating methods, for example, a dip coating method, an air knife coating method, a curtain coating method, a roller coating method, a wire bar coating method and a gravure coating method, or an extrusion coating method using a hopper described in U.S. Pat. No. 2,681,294, etc. If desired, two or more layers may be applied at the same time by a method described in U.S. Pat. Nos. 2,761,791, 3,508,947, 2,941,898 and 3,526,528, and *Coating Technology*, p. 253, written by Harasaki et al. (published by Asakura Shoten Co., 1973), etc.

The coating amount of the copolymer according to the present invention is preferably in a range of from 0.01 to 10 g and more preferably from 0.2 to 3 g (solid content) per square meter of the plastic film base.

The subbing solution thus-coated is then dried in a drying step. The drying can be carried out by suitably selecting the temperature and the time within the ranges of from 120° C. to 200° C. and from 30 seconds to 10 minutes.

In the present invention, the expression "plastic film base" includes films comprising, for example, cellulose esters (particularly, celluloe triacetate, cellulose diacetate, and cellulose propionate), polyamides, polycarbonates, polyesters (particularly, polyethylene terephthalate, poly-1,4-cyclohexanedimethylene terephthalate, and polyethylene-1,2-diphenoxyethane-4,4'-dicarboxylate), polystyrenes, polypropylene or polyethylene, etc., and compound films prepared by coating or laminating paper or another base with the above-described film.

Among these plastic film bases, polyethylene terephthalate films are the most suitable to use. Particularly, biaxially stretched thermally set polyethylene terephthalate films are advantageously used in view of their stability and strength.

The thickness of the plastic film base is not particularly restricted. However, a thickness of from 15 to 500μ, and particularly from 40 to 200μ, is advantageous from the viewpoint of easy handling and common uses.

Further, the base may be transparent, may contain dyes, or may contain pigments such as titanium dioxide. Moreover, it may contain silicon dioxide, alumina sol, chromium salts, zirconium salts, etc.

To the base provided with the subbing layer according to the present invention, photographic layers are applied by conventional coating methods to produce a photographic light-sensitive material.

As the photographic layers, there are, for example, a silver halide emulsion layer, an intermediate layer, a filter layer, a surface protective layer, and a backing layer, etc.

These photographic layers contain a hydrophilic colloid as a binder. Examples of the hydrophilic colloid include gelatin, phthalated gelatin, maleated gelatin, carboxymethyl cellulose, hydroxyethyl cellulose, grafted gelatin, polyvinyl alcohol, polyhydroxyalkyl acrylate, polyvinyl pyrrolidone and copoly-vinyl pyrrolidone-vinyl acetate, etc. Beside these hydrophilic colloids, they may contain a dispersion of a water-insoluble or poorly soluble synthetic polymer. For example, it is possible to use polymers composed of one or more of alkyl acrylates (or methacrylates), alkoxyalkyl acrylates (or methacrylates), glycidyl acrylates (or methacrylates), acrylamide (or methacrylamide), vinyl esters (for example, vinyl acetate), acrylonitrile, olefins or styrene, etc., as monomer components.

In addition, the photographic layers may contain silver halide particles, chemical sensitizers, antifogging agents, stabilizers, hardening agents, antistatic agents, coating assistants, matting agents, whitening agents, spectral sensitizing dyes, dyes and color couplers, etc.

These additives are described in *Research Disclosure*, Vol. 92, pp. 107–110 (December 1971).

In the following, the present invention is illustrated by reference to examples. However, the present invention is not limited thereto.

Adhesion tests in examples were carried out by the following methods.

(1) Adhesion test in a dry state:

An emulsion surface of an unexposed non-developed dry film and that of a dried film after imagewise exposure and photographic development were scratched by a razor to form mesh scratches at intervals of about 4 mm. Then, an adhesive tape (Scotch Tape (trademark) produced by Sumitomo 3M Co.) was adhered to the emulsion surface and stripped off in an instant. The case wherein the stripped part was from 0% to 5% is shown as Grade A, the case wherein the stripped part was from 5% to 30% is shown as Grade B, and the case wherein the stripped part was from 30% to 100% is shown as Grade C.

(2) Adhesion test in a wet state:

An emulsion surface of a film was scratched by a steel pen in a processing solution in a step of development, fixation or water wash to form two cross scratches. The scratched part was then rubbed by a finger tip in a perpendicular direction to the scratch lines. The case that the emulsion layer is not stripped is shown as Grade A. The case wherein the maximum stripping width was 5 mm or less is shown as Grade B, and the case wherein the maximum stripping width was larger than 5 mm is shown as Grade C.

(3) Surface scratch test:

A subbing solution was applied to a 180μ PET base, and subjected to drying and heat treatment at 180° C. for 1 minute. In this case, with using a coater, the base was conveyed at 50 m/min so as to contact the surface of the subbing layer with a roll. Then, a test strip for observing the surface state (21×30 cm) was removed from the base, and scratches formed are observed by transmitted light. The case wherein no scratches were formed is shown as Grade A. The case wherein scratches were partially formed is shown as Grade B. The case wherein scratches were formed on the whole surface is shown as Grade C.

EXAMPLE 1

A subbing solution having the following composition was applied to a 180μ crystallized polyethylene terephthalate film which was biaxially stretched and orientated.

It was then subjected to drying and heat treatment at 180° C. for 1 minute to obtain a coated material having a dry subbing layer thickness of 0.5μ. To this base having a subbing layer, a silver halide emulsion for X-ray use (AgBrI, I=2.5% by mol) was applied so as to be 3 g of silver and 3.5 g of gelatin per square meter.

| Subbing Composition (1) | |
|---|---|
| Butadiene-styrene-divinylbenzene-acrylic acid copolymer latex (solid content: 50%; ratio by weight of butadiene/styrene = 33/67; divinylbenzene content: 0.5% by weight based on the total amount of butadiene-styrene; acrylic acid content: 1% by weight based on the total amount of butadiene-styrene; gel fraction: 70% by weight) | 10 cc |
| 8% Aqueous solution of 2,4-dichloro-6-hydroxy-s-triazine sodium salt | 2 cc |
| Distilled water | 150 cc |

| Subbing Composition (2) | |
|---|---|
| Butadiene-styrene-acrylic acid copolymer latex (solid content: 50%; ratio by weight of butadiene/styrene = 33/67; acrylic acid content: 1% based on the total amount of butadiene-styrene; gel fraction: 70% by weight) | 10 cc |
| 8% Aqueous solution of 2,4-dichloro-6-hydroxy-s-triazine sodium salt | 2 cc |
| Distilled water | 150 cc |

| Subbing Composition (3) | |
|---|---|
| Butadiene-styrene-acrylic acid copolymer latex (solid content: 50%; ratio by weight of butadiene/styrene = 33/67; acrylic acid content: 1% by weight based on the total amount of butadiene-styrene; gel fraction: 40%) | 10 cc |
| 8% Aqueous solution of 2,4-dichloro-6-hydroxy-s-triazine sodium salt | 2 cc |

| Subbing Composition (3) | |
|---|---|
| Distilled water | 150 cc |

TABLE 2

| Subbing Composition | Adhesive Strength in Wet State | Adhesive Strength in Dry State | Surface Scratch Test |
|---|---|---|---|
| (1) | A | A | A |
| (2) | B | A | A |
| (3) | A | A | C |

In the photographic light-sensitive films thus-obtained, the adhesive strength in a wet state was Grade A in case of the subbing compositions (1) and (3), but was Grade B in case of the subbing composition (2). The adhesive strength in a dry state was Grade A in every case. In the surface scratch test, the subbing compositions (1) and (2) showed Grade A, but the subbing composition (3) showed Grade C. Furthermore, photographic properties of the photographic light-sensitive films were excellent in every case.

EXAMPLE 2

Subbing solutions having the subbing compositions (1), (2), and (3) as in Example 1, and the following subbing composition (4) were applied to a 180μ crystallized polyethylene terephthalate films which was biaxially stretched and orientated. They were then subjected to drying and heat treatment at 160° C. for 1 minute to obtain a coated material having a dry subbing layer thickness of 0.5μ. Thereafter, an emulsion was applied according to Example 1.

| Subbing Composition (4) | |
|---|---|
| Butadiene-styrene-divinylbenzene copolymer latex (solid content: 50%; ratio by weight of butadiene/styrene: 33/67; divinylbenzene content: 0.5% by weight based on the total amount of butadiene-styrene; gel fraction: 70%) | 10 cc |
| 8% Aqueous solution of 2,4-dichloro-6-hydroxy-s-triazine sodium salt | 2 cc |
| Distilled water | 150 cc |

TABLE 3

| Subbing Composition | Adhesive Strength in Wet State | Adhesive Strength in Dry State | Surface Scratch Test |
|---|---|---|---|
| (1) | B | A | A |
| (2) | C | A | A |
| (3) | B | A | C |
| (4) | A | A | A |

In the photographic light-sensitive films thus-obtained, the adhesive strength in a wet state was Grade A in the case of subbing composition (4), but it was Grade B in the case of the subbing compositions (1) and (3) and Grade C in case of the subbing composition (2). The adhesive strength in a dry state was Grade A in every case. In the surface scratch test, the subbing compositions (1), (2), and (4) showed Grade A, but the subbing composition (3) showed Grade C. Furthermore, photographic properties of the photographic light-sensitive films were excellent in every case.

While the invention has been described in detail and with reference to specific embodiments thereof, it will be apparent to one skilled in the art that various changes and modifications can be made therein without departing from the spirit and scope thereof.

What is claimed is:

1. A subbing process for a photographic light-sensitive material comprising applying a polymer latex to a plastic film base, wherein said polymer is a copolymer composed of (1) a diolefin monomer, (2) at least one monovinyl monomer, and (3) at least one monomer having two or more vinyl groups, acryloyl groups, methacryloyl groups, or allyl groups excepting the diolefin monomer, and having a gel fraction of the polymer in the latex from 50% to 95% by weight, wherein said plastic film base is biaxially stretched and wherein said polymer latex is applied in solution on the plastic film base and dried at a temperature of from 120° C. to 200° C. from 30 seconds to 10 minutes.

2. A subbing process for a photographic light-sensitive material comprising applying a polymer latex to a plastic film base, wherein said polymer is a copolymer composed of components (1) a conjugated diolefin monomer, (2) at least one monovinyl monomer selected from (i) styrene, acrylonitrile, methyl methacrylate, vinyl chloride, vinyl acetate, and derivatives thereof, and (ii) alkyl acrylates, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylolated acrylamide, N-methylolated methacrylamide, vinyl isocyanate, and allyl isocyanate, and (3) at least one monomer having two or more vinyl groups, acryloyl groups, methacryloyl groups, or allyl groups, selected from the group consisting of divinylbenzene, 1,5-hexadiene-3-yne, hexatriene, divinyl ether, divinyl sulfone, diallyl phthalate, diallyl carbinol, diethylene glycol dimethacrylate, trimethylolpropane trimethacrylate, and trimethylolpropane dimethacrylate, and the gel fraction of the polymer in the latex is from 50% to 90% by weight, wherein said plastic film base is biaxially stretched and wherein said polymer latex is applied in solution on the plastic film base and dried at a temperature of from 120° C. to 200° C. from 30 seconds to 10 minutes.

3. A subbing process as in claim 2, wherein said conjugated diolefin monomer component (1) is selected from butadiene, isoprene, and chloroprene.

4. A subbing process as in claim 2, wherein the monovinyl monomer (2) is selected from the group consisting of methylstyrene, dimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, and methyl vinylbenzoate.

5. A subbing process as in claim 2, wherein the monovinyl monomer (2) is selected from the group consisting of acrylic acid esters, glycidyl acrylate, glycidyl methacrylate, 2-hydroxyethyl-acrylate, and 2-hydroxyethyl methacrylate.

6. A subbing process as in claim 1, 2, or 3, wherein the diolefin monomer (1) content is from about 10% to 60% by weight, based on the total weight of components (1) and (2).

7. A subbing process as in claim 1, 2, or 3, wherein the diolefin monomer component (1) content is from about 15% to 40% by weight, based on the total weight of components (1) and (2).

8. A subbing process as in claim 1, 2, 3, 4, or 5, wherein the monovinyl monomer component (2) content is from 90% to 40% by weight, based on the total weight of components (1) and (2).

9. A subbing process as in claim 4, wherein the component (2) is a polystyrene derivative which is present in a content of from about 70% to 40% by weight, based on the total weight of components (1) and (2).

10. A subbing process as in claim 1, 2, 3, 4, or 5, wherein the monomer component (3) content is from 0.01% to 10% by weight, based on the total weight of the diolefin monomer component (1) and the monovinyl monomer component (2).

11. A subbing process as in claim 10, wherein the monomer component (3) content is present in the copolymer in a content of from 0.1% to 5% by weight, based on the total weight of the diolefin monomer component (1) and the monovinyl monomer component (2).

12. A subbing process as in claim 1 or 2, wherein the gel fraction of the polymer in the latex is from 60% to 90%.

13. A subbing process as in claim 1 or 2, wherein the weight of the copolymer in the polymer latex is from 10% to 60% by weight, based on the total weight of the polymer latex.

14. A subbing process as in claim 1 or 2, wherein the weight of the copolymer in the polymer latex is from 30% to 50% by weight, based on the total weight of the polymer latex.

15. A subbing process as in claim 1, 2, 3, 4, or 5, wherein the copolymer is coated in an amount of from 0.01 to 10 g (solid content) per square meter of the plastic film base.

16. A subbing process as in claim 1, 2, 3, 4, or 5, wherein the copolymer is coated in an amount of from 0.2 to 3 g (solid content) per square meter of the plastic film base.

17. A subbing process as in claim 1, wherein the content of ethylenically unsaturated carboxylic acid component in the copolymer is 0%.

* * * * *